United States Patent

[11] 3,620,889

| [72] | Inventor | Donald H. Baltzer<br>Cincinnati, Ohio |
|---|---|---|
| [21] | Appl. No. | 736,119 |
| [22] | Filed | June 11, 1968 |
| [45] | Patented | Nov. 16, 1971 |
| [73] | Assignee | Vari-Light Corporation<br>Cincinnati, Ohio |

[54] LIQUID CRYSTAL SYSTEMS
17 Claims, 8 Drawing Figs.

[52] U.S. Cl. .................................................. 161/5,
23/230, 156/145, 156/306, 161/6, 161/410,
250/83, 252/408, 350/160
[51] Int. Cl. ....................................................... B44f 1/00,
C09k 3/00
[50] Field of Search .......................................... 250/83;
350/160, 160 P, 267, 312, 313; 252/408; 23/230,
232, 253–256; 264/4, 248; 156/145, 306; 161/1, 5,
6, 408–410

[56] References Cited
UNITED STATES PATENTS

| 2,757,291 | 7/1956 | Schulman et al. | 252/408 X |
| 2,928,791 | 3/1960 | Loconti | 252/408 |
| 3,386,807 | 6/1968 | Edenbaum | 252/408 X |
| 3,409,404 | 11/1968 | Fergason | 252/408 X |
| 3,415,991 | 12/1968 | Asars | 250/83 |
| 3,441,513 | 4/1969 | Woodmansee | 161/410 X |
| 3,466,216 | 9/1969 | Cooley et al. | 161/5 |
| 3,445,291 | 5/1969 | Stein | 252/408 X |
| 3,490,988 | 1/1970 | Motter et al. | 161/199 |

Primary Examiner—William A. Powell
Attorney—Melville, Strasser, Foster & Hoffman ABSTRACT: Systems incorporating liquid crystals which are thermally sensitive and optically responsive to temperature changes.

PATENTED NOV 16 1971 3,620,889
SHEET 1 OF 2
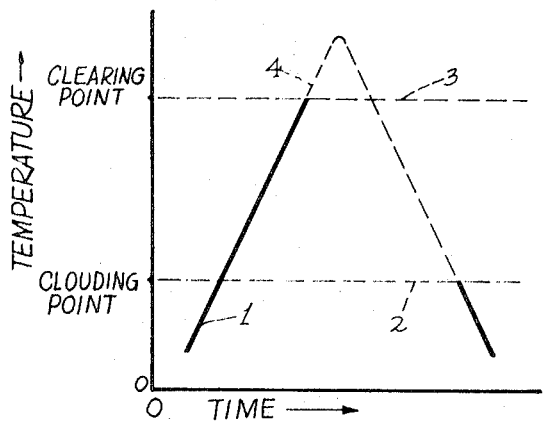
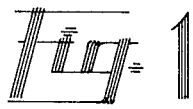
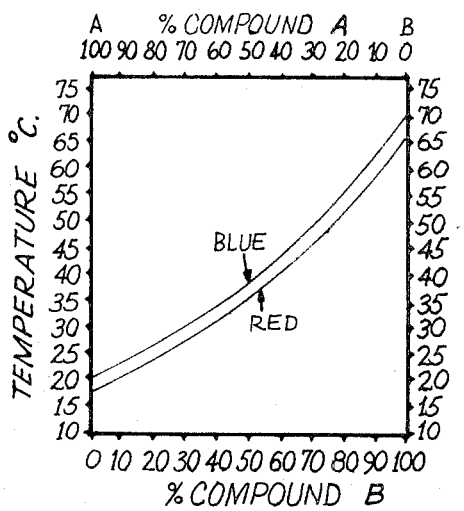
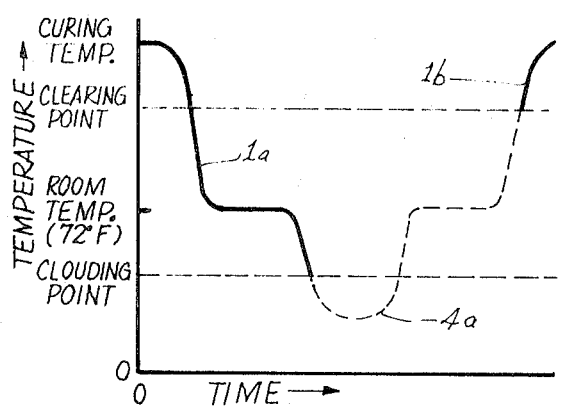
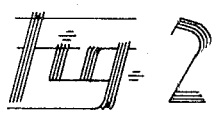
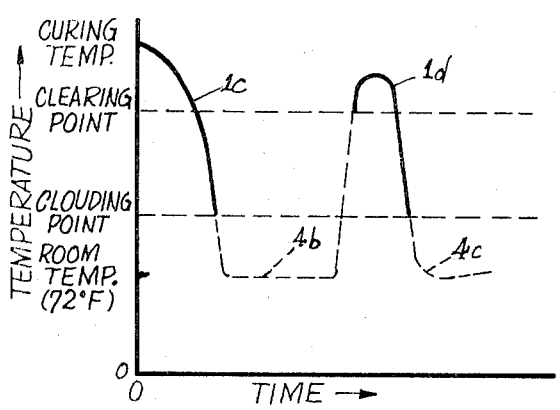
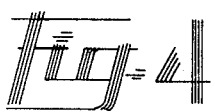
INVENTOR/S
DONALD H. BALTZER
BY Melville, Strasser, Foster and Hoffman
ATTORNEYS

PATENTED NOV 16 1971 3,620,889

INVENTOR/S
DONALD H. BALTZER

BY *Melville, Strasser, Foster and Hoffman*
ATTORNEYS

LIQUID CRYSTAL SYSTEMS

BACKGROUND OF THE INVENTION

The term liquid crystals is the popular designation for a class of materials almost exclusively derivatives of cholestrol commonly called the cholestryl esters, which have the unique property of scattering light of various colors over a specific short temperature range, the colors varying with temperature within the range. At low temperature a liquid crystal compound will normally exist in its crystalline form. As heat is applied to the liquid crystal compound, the compound does not show a sharp melting point as do most materials. Rather, as the temperature is increased, the material will first fuse and soften like a liquid but will stay cloudy and optically active until a particular higher temperature is reached. At this higher temperature the cloudy condition clears completely and the compound becomes a true liquid. It is between these two temperatures, i.e., the melting point and the clearing point, that some of the cholestryl esters display vivid colors according to the temperature. Upon heating, the normal sequence of colors exhibited is from red through the spectrum to blue and then to clear at the clearing point. The color display is reversible, so that normally the same colors will be apparent when cooling the material below the clearing point.

Due to this unique property, liquid crystals are useful for precise measurement of surface temperatures of various articles when they are applied as a thin coating. For example, in the testing of electronic circuit boards and integrated circuits, the liquid crystals can be applied directly to an integrated circuit and, by observing the various colors at different points, hot spots which may occur can be pinpointed. Another application is in testing the integrity of a honeycomb panel. If the liquid crystals are applied to one surface of a honeycomb panel, heat will be conveyed along the honeycomb interior of the structure to the coated surface which will begin to exhibit color changes in the heated areas. Where a poor bond exists between the honeycomb inner layer and the surface skin, increased heat resistance will retard the heating of the coating in the defective areas. Consequently, by observing color differences in the liquid crystal coating, voids or poor bonds in the panel structure can be readily detected.

In the current use of liquid crystals, the normal technique is to apply the liquid crystals to the surface to be tested from an organic solvent solution. The solvent is allowed to evaporate leaving behind a thin residual coating of the liquid crystals. With gentle warming to make certain all of the solvent has evaporated, the liquid crystals will begin to display their colors at the proper temperature. However, the residual coating is greasy and sticky and hence has a decided tendency to collect dust and dirt from the air. In addition, the liquid crystals themselves are capable of absorbing gases from the air which can change the functional temperatures at which the color changes occur. Consequently, airborne contaminants, whether inert or of a gaseous nature, can readily cause performance problems in the use of liquid crystals for testing purposes. In addition, after testing the liquid crystals normally have to be removed from the article to which they have been applied. This is frequently difficult to do since the greasy character of the coating requires the use of an organic solvent for removal. Oftentimes several washings are required to completely remove the liquid crystal coating.

There is also a lack of permanence in the liquid crystals due to degradation caused by ultraviolet light and by oxidation. Degradation is also brought about by the contaminants which are picked up by or absorbed in the coating from the atmosphere. Although the liquid crystal color phenomenon is usually reversible, a coating cannot be used indefinitely because of the degradation which will take place and because normal handling is not possible without fingerprinting or otherwise marring the coating or rubbing it off by contact with other objects.

Since the colors displayed by the liquid crystals are caused by a small amount of incident light being scattered back to the eye of the observer, the color is a color of scattering and is not due to light absorption. With only a small portion of the incident light being reflected back, it is oftentimes difficult to see the colors unless there is a proper background. The colors are observed most readily if the liquid crystals are applied to a black background. While a suitable background can be obtained by first applying black paint to the article, a number of problems are involved. Care must be taken so that the paint does not contaminate the liquid crystals so as to change their operating temperatures or otherwise interfere with the color display. While special water base paints have been developed which do not contaminate the liquid crystals, the very presence of the paint adds an additional heat transfer barrier which is undesirable in cases where very small temperature differences are to be measured.

While it has hitherto been suggested to dissolve a black dye in the liquid crystals to provide a black background, such efforts have been unsatisfactory in that the presence of the dye as a soluble impurity not only interferes with the exact temperatures at which colors are displayed, but may very well contaminate the liquid crystal molecular formation to the point where color changes cannot be observed at all.

Consequently, while various uses have been proposed for liquid crystals, inclusive of the thermal imaging devices set forth in U.S. Pat. No. 3,114,836 dated Dec. 17, 1963, such uses have been of relatively limited character due to the lack of systems which are relatively permanent, which are much less susceptible to contamination and degradation, which are far less susceptible to physical damage in handling and use, and which do not require the use of a separately applied black undercoat to provide the necessary background for viewing the color change.

RESUME OF THE INVENTION

A principal object of the present invention is the provision of liquid crystal systems incorporating cholesteryl esters, which systems are relatively permanent and highly resistant to physical damage, the liquid crystal materials being incorporated in a plastic resin either in the form of a film or in the form of a casting.

Another principal object of the invention is the incorporation in the liquid crystals of an insoluble light-absorbing pigment, such as carbon black, which affords good visibility of the color phenomenon without adversely affecting the temperature characteristics of the liquid crystals and to the elimination of a separately applied black background.

Another object of the invention is the provision of liquid crystal systems wherein the liquid crystals are incapsulated in a blister composed of thin sheets of plastic which are sealed about their edges.

It is also within the spirit of the invention to combine the features of the foregoing, as by incorporating a light-absorbing pigment in a plastic resin containing the liquid crystals or by incorporating such pigment in a cast resin containing the liquid crystals. Where the liquid crystals are incapsulated in a blister, the inorganic pigment may be admixed with the crystals, in which event both of the plastic films will be clear. In the alternative, one of the sheets of plastic film may itself be black so as to provide the necessary background for observing the color phenomenon.

There are, of course, a variety of cholesteryl compounds, each of which possesses its own melting and clearing points and each exhibiting the different portions of the spectrum at different temperatures. For example, some materials will have only a 3° C. temperature difference between the melting point and the clearing point, while others will have a much greater temperature spread. However, each of the compounds normally goes through the color spectrum only once, that is from red to blue upon heating and the reverse upon cooling. It is possible, however, to arrive at any desired temperature range by mixing together liquid crystal compounds of differing melting and clearing points to arrive at the desired temperature range of the mixture.

While it has hitherto been believed impossible to incorporate liquid crystals in a plastic coating or other medium wherein the liquid crystals would be immobilized, it has been discovered that they can be incorporated in clear plastic resins, such as an acrylic resin, without inhibiting their ability to change color when heated. The resulting systems are vastly superior to those heretofore known in that they are protected against contamination and against marring and other abrasion which reduces their efficiency and useful life. The systems can be readily handled and reused, and consequently have opened numerous new fields of use for liquid crystals.

It also has been discovered that where liquid crystals are incorporated in a heat-curing resin and cured at elevated temperature to form a cast sheet, the resultant casting has the ability to turn from clear to opaque upon being subsequently cooled and to clear upon being reheated. Such systems lend themselves to a variety of uses. For example, they can be used as data storage elements on which data can be impressed using an infrared lamp as a heat source. By irradiating designated areas of the element, the designated areas will become clear so that upon scanning with a light source and a light detector, the clear areas will transmit light from the light source to the detector and hence activate the data retrieving mechanism. Such elements have the advantage of being erasable by using a thermoelectric cooling unit, it being only necessary to cool the element to the cloudy point to erase the data previously impressed on it, thereby rendering it reusable upon subsequent irradiation.

Systems of the character just described also may be used as adjustable rear-projection screens in which the amount of diffusion or degree of scattering of the light can be adjusted by heating or cooling the screen to achieve the exact amount of light scattering that is desired. Such systems can also be used to provide windowpanes which can be made either transparent or frosted at will by changing their temperature. For example, by providing as the windowpane a plastic element containing liquid crystals which would normally become cloudy at room temperature, the windowpane normally will be nontransparent for privacy. However, by combining such plastic sheet with an electrically conducting sheet of glass as a heating element, the sheet can be heated to become transparent. By turning off the heating element, the unit will cool to room temperature and opacity will return.

By using a plastic liquid crystal system at the focal point of an optical system, it can be utilized to register images which are to be retained. After the images have served their purpose they can be erased and reused. This is particularly useful for registering infrared images. Similarly, such systems can be utilized to make temporary projection slides, the images being impressed by infrared energy through negatives, whereupon the slides so produced can be projected in the ordinary manner. The images can be subsequently erased so that the slides may be reused.

A coating of a liquid crystal containing plastic material may be applied to a plastic tape and used for the recording of sound. In such system, the sound vibrations will be translated to the tape by means of variations in heat or infrared radiation, rather than by magnetization which is the common method in use today. Similar considerations apply to the application of such coatings to the edge of a motion picture film to form the basis for a sound strip.

Coatings in accordance with the invention can also be applied to paper or other carrier webs to produce images by heat comparable to the thermographic processes which are now in use. However, such paper can be reused by an erasure process as previously described.

From what has been previously stated, it should be readily apparent that liquid crystal systems in accordance with the invention have wide and diverse fields of utility and numerous additional fields of utility will suggest themselves, inclusive of the use of plastic coated systems as temperature indicators. For example, fastened to the jacket of a heated vessel an indicator can be provided which will record whether a given high or low temperature has been reached.

DESCRIPTION OF THE DRAWINGS

FIG. 1 is a graph illustrating the clearing and clouding phenomenon exhibited by liquid crystals which are incorporated in a heat cured resin.

FIG. 2 is a graph illustrating the admixing of two liquid crystal compounds having different temperature display ranges.

FIGS. 3 and 4 are graphs illustrating the clearing and clouding effects which takes place in cured systems under varying temperature conditions.

Figure 5:
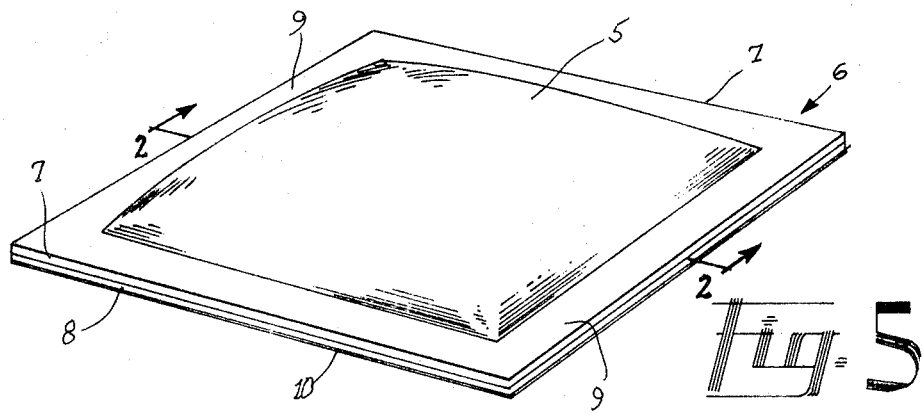
FIG. 5 is a perspective view of a blister formed in accordance with the invention.

At the outset it should be made clear that the present invention deals with two distinctive different phenomenon which take place using liquid crystals. The first is the color display phenomenon which takes place within a given temperature range and which is apparent in the liquid crystals alone, when they are incapsulated in a packet composed of sheets of plastic film or when the liquid crystals are admixed with a solvent solution of a plastic resin to form a system which may be coated on the object to be tested. The second phenomenon is a clearing and clouding phenomenon which takes place when the liquid crystals are dissolved in a heat-curing plastic resin which is then cured. Where this is done, the resultant systems display the unique ability to be made either opaque (cloudy) or clear (transparent) depending upon their temperature and their past history. This clouding and clearing phenomenon is not to be confused with the clouding and clearing effect which takes place when a pure liquid crystal compound is heated. To explain, a liquid crystal compound normally has a somewhat milky appearance when in its solid or crystalline phase. As the compound is heated it enters its liquid crystal stage in which it begins to fuse and soften but is still not a true liquid. It is in this phase that the color display phenomenon takes place; but the compound is still essentially milky and optically active. Upon further heating the liquid crystals enter the true liquid phase in which they become clear or transparent. There is a relatively sharp line of demarcation between the liquid crystal phase and the true liquid phase and the conversion from one to the other is reversible within a relatively narrow temperature range.

In contrast to the foregoing, the clouding and clearing phenomenon exhibited when the liquid crystals are dissolved in a heat-cured resin is wholly different. This can possibly be best explained by reference to FIG. 1 of the drawings, which is a graph illustrating the effect of temperature on a heat cured resin-liquid crystal system. As seen therein, the system is opaque or cloudy at low temperatures, as illustrated by the solid line 1. It is believed that at relatively low temperatures the liquid crystals will have been precipitated out of solution and exist in the plastic carrier as discrete or isolated entities entrapped in pockets as it were in the surrounding plastic. As the system is heated a clouding point 2 is reached at which the liquid crystals begin to soften although they do not truly dissolve until the clearing point 3 is reached, which may be at a substantially higher temperature. As the temperature is raised between the clouding and clearing points the system remains essentially cloudy and clearing does not noticeably take place until the temperature of the system closely approaches the clearing point 3. Upon passing the clearing point the liquid crystals dissolve and become a true liquid, as indicated at 4, and the system becomes clear, i.e., transparent. Upon subsequent cooling, however, the system will remain clear as its temperature passes downwardly through the clearing point 3 and will remain essentially clear until the clouding point 2 is again reached and the liquid crystals precipitate out of solution.

An appreciable temperature span may exist between the clearing and clouding points in such systems, depending upon the particular liquid crystal compound being used and its solubility in the plastic carrier. It is this clearing and clouding phenomenon which is utilized to produce systems having numerous useful applications. While the color change phenomenon may also be present in the cured systems, it is generally relatively obscure and may not occur at all even though the liquid crystal compounds themselves may otherwise exhibit the color display phenomenon.

Considering first the color phenomenon and the use of liquid crystals in systems designed to take advantage of the phenomenon, the following cholesteryl esters have been found to be particularly suited for use in producing liquid crystal systems in accordance with the instant invention:

Cholesteryl Acetate
Cholesteryl Propionate
Cholesteryl Valerate
Cholesteryl Butyrate
Cholesteryl Hexanoate
Cholesteryl Heptanoate
Cholesteryl Octanoate
Cholesteryl Nonanoate (Pelargonate)
Cholesteryl Decanoate
Cholesteryl Laurate
Cholesteryl Myrsitate
Cholesteryl Palmitate
Cholesteryl Benzoate
Cholesteryl Cinnamate
Cholesteryl B-Nitro Benzoate
Cholesteryl Crotonate
Cholesteryl Caproate
Cholesteryl Undecenoate
Cholesteryl Oleate
Cholesteryl Oleyl Carbonate
Cholesteryl Methyl Carbonate
Cholesteryl Ethyl Carbonate
Cholesteryl N-Propyl Carbonate
Cholesteryl Cinnamyl Carbonate
Cholesteryl Allyl Carbonate
Cholesteryl Hydrogen Phthalate The foregoing liquid crystal compounds may be employed singly or in various combinations, depending upon the desired temperature range. As previously indicated, each compound will have its own temperature range in which the color phenomenon will take place and the particular compound displaying the desired color active range will be selected. However, in the event a single compound cannot be found having the range desired, the desired range may be obtained by mixing two compounds together. A typical example is given in FIG. 2 wherein liquid crystal compound "A" displays colors in a temperature range of from about 18° to about 20° C. and liquid crystal compound "B" displays colors in a temperature range of from about 68° to about 70° C. When the two compounds are mixed in the proportions indicated color ranges may be established at essentially any desired point. Thus, by way of example, a mixture having a color display range of from 35° to 37° C. can be achieved by admixing equal amounts by weight of compounds A and B. While the color display range of mixtures of liquid crystals having essentially the same breadth of temperature range can be readily predicted, such predictability does not usually follow where two liquid crystal components are admixed which have color display temperature ranges of different breadths, as where one of the compounds might have a range of 2° C. and the other a range of 15° C. In such cases the color display temperature range of any given mixture of the two compounds must be determined empirically.

In accordance with the invention, the liquid crystal compound or mixture is dissolved in a plastic resin. In a typical example, the liquid crystals may be admixed with an acrylic resin, such as Rohm & Hass Acryloid B-66 acrylic resin, which is a 40 percent solid solution in toluene. While different liquid crystal compounds will function best at slightly different concentrations depending upon their compatibility with the resin, which in turn depends upon molecular structure and weight, as well as other characteristics of the compound, it has been found that 1 to 3 parts by weight of the liquid crystal compound to 14 parts by weight of the resin usually produces excellent results. The resultant liquid crystal system is clear and may be applied as such to a test plate or other surface. Upon application, the coating is allowed to dry at room temperature, thereby evaporating the solvent in the resin carrier. In order to insure complete solvent removal, the coated plate or the like may be heated in an oven for a short period of time at moderate temperature, i.e., 120°–150° F., to drive out residual solvents.

While acrylic resin has been found highly suited as a carrier for the liquid crystals, other plastic resins may be employed, including styrene, polyester, epoxy, polyvinyl butyral, polyvinyl chloride, polyvinyl acetate, and polycarbonate. As before, the liquid crystals will be dissolved in a solvent solution of the plastic material and applied to the object to be tested in the form of a thin coating which will be dried in situ. The resulting systems will comprise essentially a plastic film which is non-tacky when dry. While the plastic carrier will tend to lower somewhat the temperature range in which the color phenomenon will take place—usually a matter of several degrees—the color response range of any given liquid crystal plastic resin system can be readily ascertained. The systems are essentially impervious to airborne contaminants and the plastic serves as an effective barrier to inhibit oxidation. It is also possible to incorporate ultraviolet absorbers in the systems to inhibit degradation of the liquid crystals by ultraviolet light.

Where two liquid crystal compounds are admixed, the resulting mixture is then dissolved with the resin in proportions previously stated. For example, highly successful systems have been formulated by mixing one-third cholesteryl nonanoate and two-thirds cholesteryl oleyl carbonate with a 40 percent solids solution of acrylic resin in a ratio of 1 part by weight of the combined liquid crystal compounds to 14 parts by weight of the resin.

While liquid crystal containing plastic coatings may be applied to an object which has been previously painted black where the natural color of the object is such that it is difficult to perceive the color changes, the instant invention contemplates the addition of an insoluble black pigment to the coating mixture. Preferably, the insoluble pigment comprises a very fine particle size carbon black pigment which is admixed with the liquid crystals. The amount of carbon black added appears to be fairly critical in that the amount must be sufficient to provide a dark background and yet, if the quantity is excessive, the color change will be obscured. It has been found that using Cabot's Sterling R carbon black pigment, a concentration between 0.05 percent to 1 percent of carbon black by weight to the weight of the liquid crystals provides excellent visibility of the color phenomenon. This is true both when the liquid crystals are applied directly to the object being tested or are incorporated in a plastic coating or casting. It is essential, however, that the pigment is insoluble when incorporated in the liquid crystals and/or in the liquid crystal, plastic resin system.

While not wishing to be bound by theory, it would appear that the particles of insoluble black pigment function differently than does a soluble dye. Where a soluble dye is dissolved in the liquid crystals to provide a black background, it appears that the dye acts as a soluble impurity which not only interferes with the temperatures at which the colors are displayed, but contaminates the liquid crystal molecular formation to the point where the colors cannot be observed at all. When a soluble black absorbing material is added to the liquid crystal coating, the black absorbing material will absorb the colors which are being scattered back in the same manner as it would absorb light from an external source. In fact, the light will be absorbed literally twice as much because the light must pass into the liquid crystal coating through the absorber and also return out through it. Where the absorber exists as discrete particles within the liquid crystals, as opposed to being dissolved therein, the absorber is in effect discontinuous and hence affords opportunity for a portion of the light to be scattered back to the eye, thereby making the color phenomenon visible to the observer.

Figure 6:
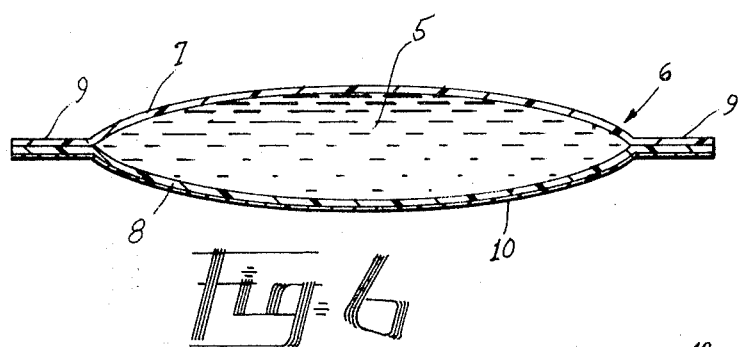
FIG. 6 is a vertical sectional view taken along the line 2—2 of FIG. 5.

Other systems may be provided which inhibit contamination of liquid crystals and at the same time eliminate the necessity for applying a separate coating of black paint or the like to render the color phenomenon visible to the eye. One such system is illustrated in FIGS. 5 and 6 of the drawings wherein the liquid crystals 5 are sealed in a blister 6 consisting of juxtaposed sheets of plastic film 7 and 8 which are edge sealed at 9 so as to form a sealed packet containing the liquid crystals. Various nonvibrous films may be utilized to form the sheets 7 and 8, although a polyester film such as Mylar coated on one surface with heat-sealing polyethylene has been found to be highly suited for the purpose, the sheets being arranged so that the heat-sealable polyethylene coatings will be in contact with each other to provide the desired edge seal.

Where an insoluble black pigment is incorporated in the liquid crystals incapsulated in the blister, both sheets 7 and 8 may be transparent. Alternatively, the black pigment may be omitted and one of the sheets formed from plastic which is black in color. Of course, if desired the blister may be applied to a surface which has been painted black, although it is preferred that the blister incorporate its own coloring agent.

Blisters of the character described have been found to be highly useful as temperature indicators for electrical condensers and like structures to which the blister may be readily affixed. To facilitate the attachment of the blister to a condenser or the like, a coating 10 of a pressure-sensitive adhesive may be applied to the outer surface of one of the sheets, such as the sheet 8, which comprises the rear side of the structure illustrated.

In systems in accordance with the invention in which the clearing and clouding phenomenon is utilized, the liquid crystal compounds enumerated above may be dissolved in a heat-curing resin, such as an acrylic resin monomer, and the mixture poured into a mold, which may comprise an opposing pair of platens having an edge sealer, whereupon the material is cured at elevated temperatures to form a hard cast sheet of plastic having the liquid crystals dispersed therein. As in the case of liquid crystals mixed with a solvent solution of a plastic resin as previously discussed, the liquid crystals are mixed with the heat-curing monomers in a ratio of 1 to 3 parts liquid crystals to 14 parts resin, the parts being by weight. While the acrylic resin monomers have been found particularly suited for casting purposes, other heat-curing resins may be employed including styrene, polyester, epoxy and polyvinyl butyrol. Normally the curing temperature will be about 140° F. for the acrylic monomers but may vary depending upon the particular liquid crystal, heat-curing resin mixture being used.

Sheets so formed display the characteristic of changing in a visually perceptible manner from a cloudy or opaque condition to a clear or transparent condition, or vice versa, depending upon variations in their temperature. The systems can be initially made either opaque or transparent depending upon the conditions under which the liquid crystal plastic resin mixture is initially cured. When the liquid crystals are initially mixed with the resin the mixture is normally clear throughout the curing treatment. While there are special cases wherein this is not true, as where the liquid crystal-resin mixture is supersaturated or where the curing temperature is below the clouding point of the particular liquid crystal compound or mixture, the following examples will serve to explain the phenomenon which takes place. Thus, with reference to FIG. 3, which illustrates a situation wherein the curing temperature of the system is above the clearing point of the liquid crystals and the clouding point is below normal room temperature, the cured system will be clear as it is removed from the mold (as indicated by the solid line 1a) and will remain clear when cooled to room temperature. In fact, it will remain clear until additionally cooled to the clouding point of the system. As the clouding point is approached the cast sheet will begin to cloud and will become opaque as its temperature is lowered below the clouding point (as indicated by the dotted line 4a), and it will remain opaque until its temperature is elevated to at least the clearing point where it again begins to clear and becomes transparent, as indicated at 1b. It will be evident, however, that once the sheet has been rendered opaque, it will remain opaque at room temperature and hence the sheet in ordinary use may be made either clear or opaque depending upon its prior history.

FIG. 4 illustrates a system wherein the clouding point of the system is above room temperature. In this instance the sheet will remain clear, as indicated by the solid line 1c, until cooled below the clouding point and hence will be opaque, as indicated by the dotted line 4b, when it reaches room temperature. Upon subsequent reheating it will turn clear when heated above the clearing point, as indicated by the solid line 1d, and will remain clear until again cooled below the clouding point, as indicated by the dotted line 4c.

It will be understood that the temperatures at which the sheets will clear or cloud will vary, depending upon the particular liquid crystal compounds employed, and also the characteristics of the particular plastic resin in which they are dissolved. Again, while not wishing to be bound by theory, it would appear that at low temperatures the liquid crystals precipitate within the plastic resin as a separate phase and hence exist as discrete entities, whereas upon being heated the crystals redissolve in the plastic material. The solubility of the liquid crystals in different resins will have an effect on the clearing and clouding points of any given system, but the proportions necessary to produce the desired effect can be readily ascertained for any given liquid crystal resin system. The presence or absence of an inorganic black pigment in the liquid crystal plastic resin casting mixture does not alter the clearing and clouding effect which takes place. In either event, the systems will clear or cloud depending upon whether the sheet was heated or cooled last.

Figure 7:
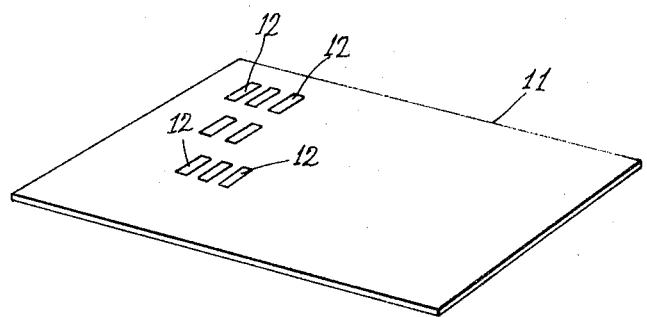
FIG. 7 is a perspective view of a cured system in which limited areas have been irradiated for data retrieval purposes.

Such cured systems lend themselves to a variety of uses a number of which have already been enumerated. FIG. 7 illustrates a cast sheet 11 having the properties of the system illustrated in FIG. 3, which may be used as a data storage device. The sheet, while in the opaque condition, is subjected to infrared heating in the limited areas 12 to cause the sheet to become transparent in those areas, thereby providing light transmitting apertures which may be utilized in conjunction with a scanning device incorporating a light detector which will be energized in accordance with the position of the apertures. When it is desired to erase the apertures, the sheet may be cooled, as by means of a thermoelectric device, to return the apertured areas to their initially cloudy or opaque condition, whereupon different apertured areas may be impressed in the sheet by subsequent reheating. It will be understood that a similar procedure would be followed in impressing other types of images on the sheet, as in the provision of projection slides and the like. By controlling the degree of clearing or clouding which takes place, which is a function of the solubilities of the liquid crystal compounds being used, the amount of diffusion or degree of scattering of light from the sheet can be controlled where it is to be used as a projection screen.

Figure 8:
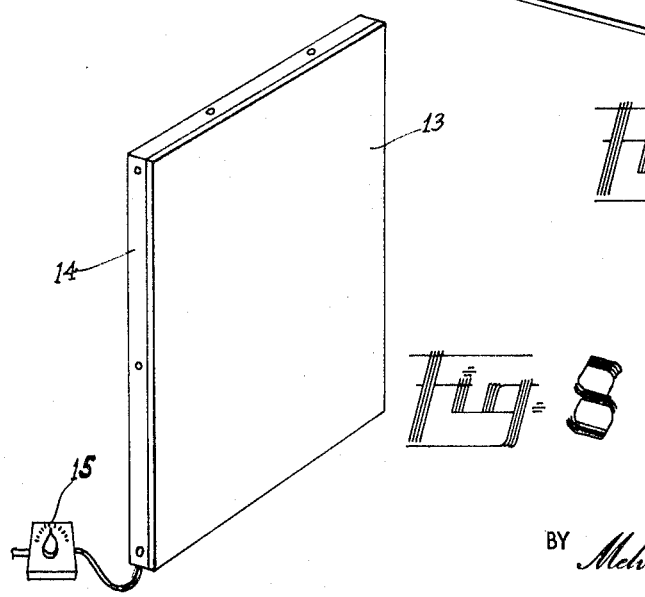
FIG. 8 is a perspective view illustrating the use of a cured system in conjunction with an electrically conductive sheet of glass.

FIG. 8 illustrates the use of a sheet having the properties of the system illustrated in FIG. 4 used as an adjustable windowpane which can be made either transparent or opaque by controlling its temperature. As seen therein, a plastic element 13 contains a liquid crystal compound which will normally become cloudy at room temperature and hence, under normal circumstances, the windowpane would be opaque for privacy. The element 13 is, however, combined with an electrically conducting sheet of glass 14 which acts as a heating element, the glass sheet being controlled by a rheostat 15 by means of which the plastic sheet may be heated to render it transparent, whereupon when the heating element is turned off the unit will cool to room temperature and the opacity will return to the plastic sheet 13.

As should now be evident, the instant invention provides a wide variety of liquid crystal systems which may be readily used and handled without contamination and which are capable of repeated reuse without losing their color changing properties. The systems may be compounded so as to incorporate a light-absorbing medium which facilitates the visual observation of the color-changing phenomenon. In addition, the systems are such that they may be provided in a variety of forms, inclusive of liquid coatings which may be applied in liquid form to the object to be tested, in the form of blisters or packets which may be readily attached to a supporting surface, and also in the form of essentially rigid or self-sustaining sheets or panels which may be caused, by temperature control, to change from a transparent to an opaque condition, and vice versa, depending upon their previous condition.

Modifications may be made in the invention without departing from its spirit and purpose, and numerous modifications will undoubtedly occur to the worker in the art upon reading this specification. For example, while heat is preferred as the medium for inducing clearing or clouding of heat-cured liquid crystal containing plastic sheets, other forms of energy may be utilized for such purpose, inclusive of ultrasonic vibrations, electrical fields, and even mechanical stresses may be utilized to induce varying degrees of conversion.

As employed in the claims which follow the term liquid crystalline substance is defined as those cholesteric liquid crystal substances as enumerated herein and their equivalents which are thermally sensitive and optically responsive to temperature changes.

The embodiments of the invention in which an exclusive property or privilege is claimed are defined as follows:

1. A thermally sensitive and optically responsive liquid crystal system comprising a cholesteric liquid crystalline substance dispersed in an organic plastic material, said liquid crystalline substance being dispersed in said plastic material in a ratio of about 1 to 3 parts liquid crystalline substance to about 14 parts plastic material, said parts being by weight.

2. The liquid crystal system claimed in claim 1 wherein said system is in the form of a discrete dry layer formed on a supporting surface.

3. The liquid crystal system claimed in claim 1 wherein said system is in the form of a self-supporting discrete sheet.

4. The liquid crystal system claimed in claim 1 wherein said plastic material comprises a plastic resin chosen from the class consisting of acrylic, styrene, polyester, epoxy, polyvinyl butyral, polyvinyl chloride, polyvinyl acetate, and polycarbonate resins.

5. The liquid crystal system claimed in claim 1 wherein said system has an insoluble light-absorbing substance dispersed therein.

6. The liquid crystal system claimed in claim 1 wherein said system includes an ultraviolet light-absorbing substance.

7. The liquid crystal system claimed in claim 1 wherein said liquid crystalline substance comprises a mixture of a plurality of different cholesteric liquid crystal compounds.

8. The liquid crystal system claimed in claim 1 wherein said system is in the form of a casting.

9. The liquid crystal system claimed in claim 8 wherein said plastic material comprises a heat-curable resin.

10. A liquid crystal system exhibiting a visually perceptible change in color in response to variations in temperture, said system being formed by dispersing a cholesteric liquid crystalline substance in solvent solution of a plastic resin chosen from the class consisting of acrylic, styrene, polyester, epoxy, polyvinyl butyral, polyvinyl chloride, polyvinyl acetate and polycarbonate resins in a ratio of about 1 to 3 parts liquid crystalline substance to about 14 parts plastic material, said parts being by weight, said system being in the form of a discrete dry layer from which the solvent has been expelled and the plastic material serves as a continuous carrier phase for the liquid crystalline substance.

11. The liquid crystal system claimed in claim 10 wherein said liquid crystalline substance is composed of a mixture of at least two different cholesteric liquid crystal compounds.

12. A liquid crystal system exhibiting a visually perceptible change between an opaque condition and a clear condition in response to variations in temperature, said system being formed by dispersing a cholesteric liquid crystalline substance in a heat-curable resin in a ratio of from about 1 to 3 parts liquid crystalline substance to about 14 parts heat-curable resin, said parts being by weight, and curing said system in sheet form, said cured sheet being characterized by a visually perceptible clouding point and a visually perceptible clearing point, said clearing point being the temperature at which the sheet changes from the opaque to the clear condition as its temperature is elevated, and said clouding point being the temperature at which the sheet changes from the clear to the opaque condition as its temperature is lowered, said clouding point occurring at a lower temperature than said clearing point.

13. The liquid crystal system claimed in claim 12 wherein the curing temperature of the resin is above the clearing point of the system.

14. The liquid crystal system claimed in claim 13 wherein the clouding point is above room temperature.

15. The liquid crystal system claimed in claim 13 wherein the clouding point is below room temperature.

16. The liquid system claimed in claim 12 wherein the curing temperature of the resin is below the clearing point of the system.

17. The liquid crystal system claimed in claim 16 wherein said heat-curable resin comprises an acrylic monomer.

* * * * *